(12) United States Patent
Litwin

(10) Patent No.: US 6,901,252 B2
(45) Date of Patent: May 31, 2005

(54) APPENDING DATABASE UPDATE INFORMATION TO VOICE CALLS FROM MOBILE DEVICES TO MINIMIZE CALL SETUP/TEARDOWN OVERHEAD

(75) Inventor: Louis Robert Litwin, Plainsboro, NJ (US)

(73) Assignee: Thomson Licensing S. A., Boulogne (FR)

( * ) Notice: Subject to any disclaimer, the term of this patent is extended or adjusted under 35 U.S.C. 154(b) by 190 days.

(21) Appl. No.: 09/988,516

(22) Filed: Nov. 20, 2001

(65) Prior Publication Data

US 2003/0096601 A1 May 22, 2003

(51) Int. Cl.$^7$ ............................. H04Q 7/38; H04M 3/42
(52) U.S. Cl. .................. 455/414.1; 455/412.1; 455/466
(58) Field of Search ................... 455/414, 466, 455/426, 412, 553, 414.1, 414.2, 414.3, 412.1

(56) References Cited

U.S. PATENT DOCUMENTS

| | | | |
|---|---|---|---|
| 5,845,215 A | * 12/1998 | Henry et al. | 455/553 |
| 6,167,255 A | * 12/2000 | Kennedy et al. | 455/414 |
| 6,259,892 B1 | * 7/2001 | Helferich | 455/412 X |

\* cited by examiner

*Primary Examiner*—Nay Maung
*Assistant Examiner*—Philip J. Sobutka
(74) *Attorney, Agent, or Firm*—Joseph S. Tripoli; Harvey D. Fried; Joseph J. Kolodka

(57) ABSTRACT

According to an aspect of the present invention, a method for providing non-voice data to a mobile device includes the step of maintaining a connection between the mobile device and a base station, when a user of the mobile device terminates a voice call provided through the base station. The non-voice data is received while the connection is maintained. The connection between the mobile device and the base station is terminated, upon performing the receiving step.

16 Claims, 4 Drawing Sheets

APPENDING DATABASE UPDATE INFORMATION TO VOICE CALLS FROM MOBILE DEVICES TO MINIMIZE CALL SETUP/TEARDOWN OVERHEAD

BACKGROUND

1. Technical Field

The present invention generally relates to mobile communications and, in particular, to a method and apparatus for providing non-voice data to a mobile device that minimizes call setup/teardown overhead.

2. Background Description

Mobile devices such as cell phones have the ability to allow the user to request and view information such as e-mail, stock quotes, weather, news, and so forth (hereinafter also referred to as "non-voice data"). The phone call (typically implemented through a cellular network) to request and download this information is typically very short in duration (on the order of just a few seconds). Nonetheless, the overhead for setting up and tearing down such a call is very high. In addition, service providers typically bill in one minute increments, so 25 one-second calls are actually billed as 25 minutes worth of airtime.

Accordingly, it would be desirable and highly advantageous to have a method and apparatus for providing non-voice data to a mobile device that minimizes call setup/teardown overhead.

SUMMARY OF THE INVENTION

The problems stated above, as well as other related problems of the prior art, are solved by the present invention, a method and apparatus for providing non-voice data to a mobile device that minimizes call setup/teardown overhead.

The present invention provides the user with a choice. The user can still get this information on his or her phone by making a call and requesting the information (typically using an Internet browser on his or her phone). The user's other option is that the user can have the information to update the database (of e-mail, weather, stock quotes, news, and so forth) on the user's phone transmitted at the end of the user's voice calls. This will only add a few seconds to the user's existing call, thus saving the network from the overhead of setting up and tearing down an additional call. Also, in cases where the minutes are rounded up, the user will save money.

According to an aspect of the present invention, a method for providing non-voice data to a mobile device includes the step of maintaining a connection between the mobile device and a base station, when a user of the mobile device terminates a voice call provided through the base station. The non-voice data is received while the connection is maintained. The connection between the mobile device and the base station is terminated, upon performing the receiving step.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for providing non-voice data to a mobile device that minimizes call setup/teardown overhead.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
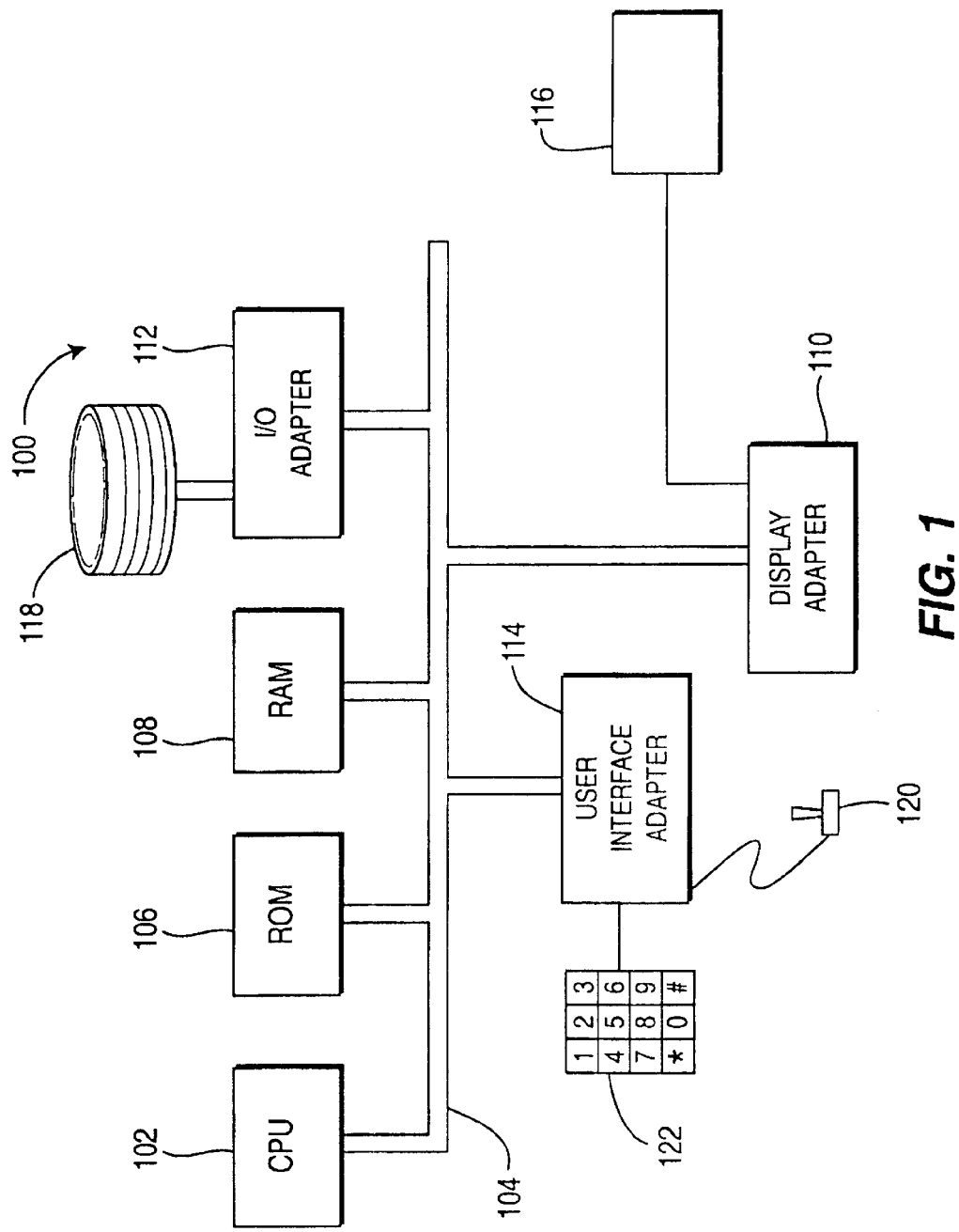
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. The computer processing system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100.

Figure 2A:
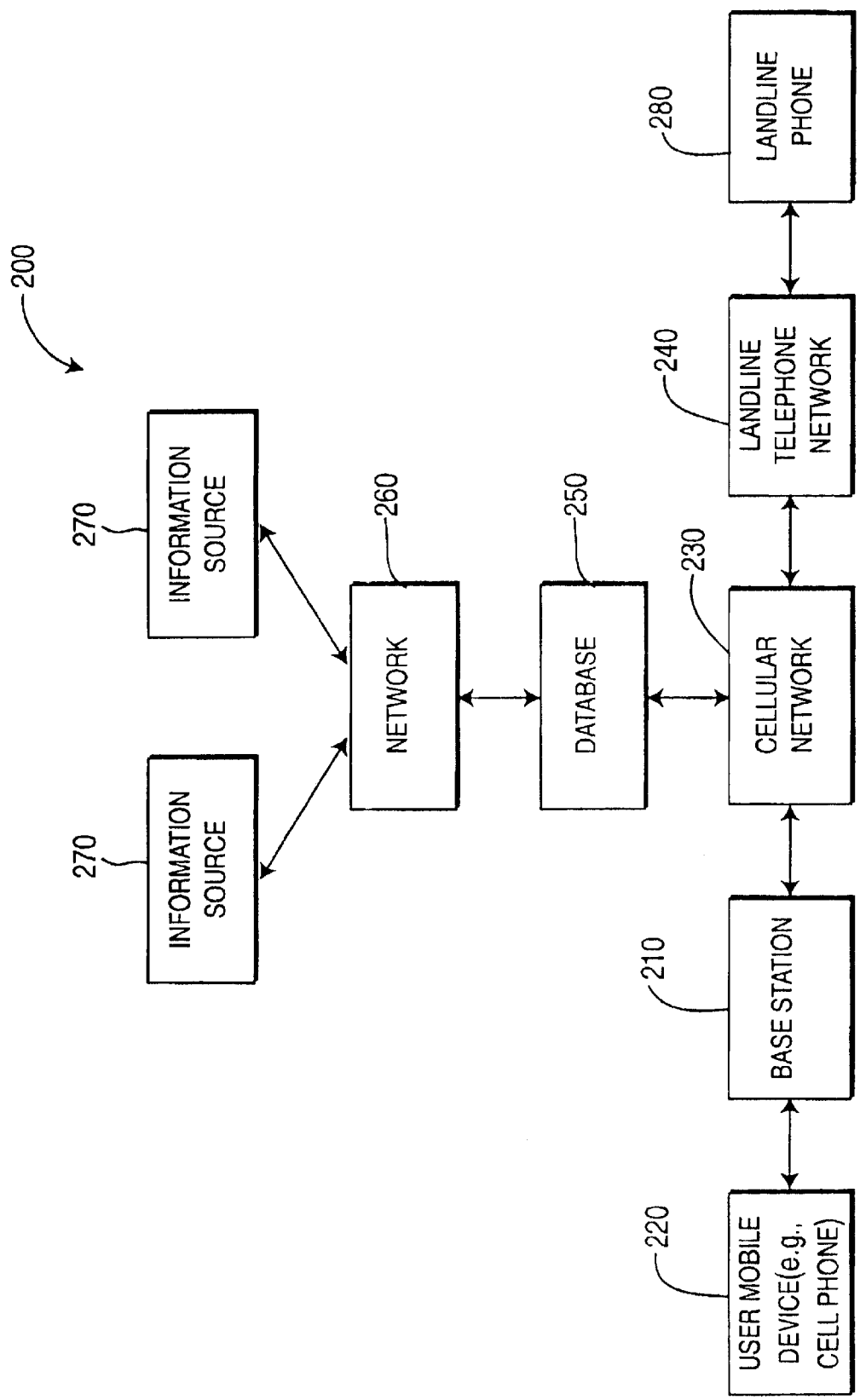
FIG. 2A is a block diagram illustrating a communication system to which the present invention may be applied, according to an illustrative embodiment of the present invention.
Figure 2B:
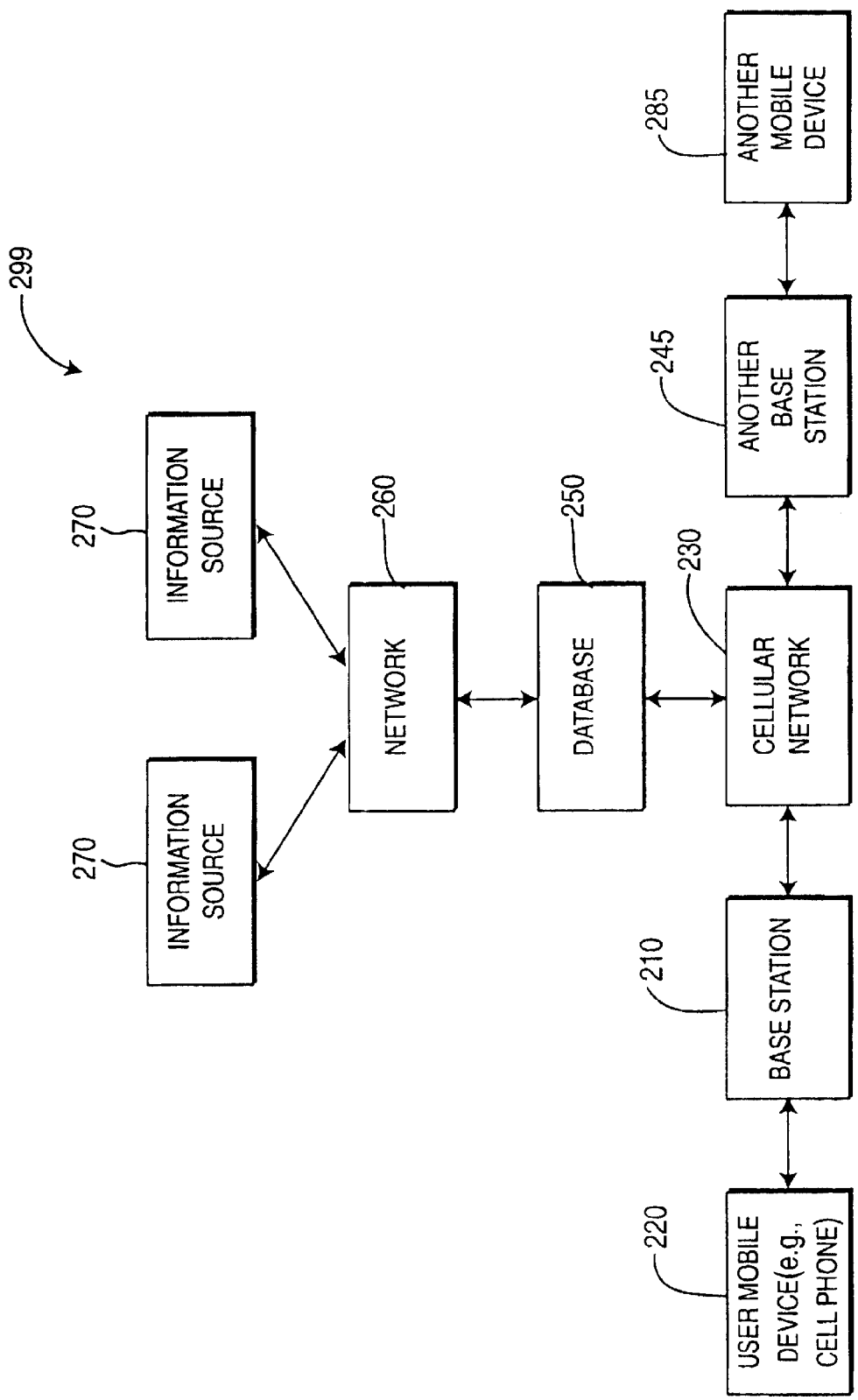
FIG. 2B is a block diagram illustrating another communication system to which the present invention may be applied, according to another illustrative embodiment of the present invention.

FIG. 2A is a block diagram illustrating a communication system 200 to which the present invention may be applied, according to an illustrative embodiment of the present invention. FIG. 2B is a block diagram illustrating another communication system 250 to which the present invention may be applied, according to another illustrative embodiment of the present invention.

It is to be appreciated that many of the elements of communication systems 200 and 299 will have a computer processing system integrated therewith. Such a computer processing system is preferably the same or similar to (having one or more of the same or similar elements) that shown in FIG. 1. However, other variations of a computer processing system may be readily employed by one of ordinary skill in the related art, while maintaining the spirit and scope of the present invention.

The communication system 200 includes a communication path formed by the following: a mobile device of a user (hereinafter also referred to as "user mobile device") 210; a base station 220; a cellular network 230; a landline telephone network 240; and a landline phone 280. The cellular network 230 is coupled to one or more databases (hereinafter "database") 250. The database 250 is coupled to a network 260 which, in turn, is coupled to various information sources 270.

It is to be appreciated that the various information sources 270 may include a plurality of databases (other than database 250) and so forth. Moreover, the network 260 itself may include sources of information. In a preferred embodiment of the present invention, the network 260 is the Internet.

The communication system 299 includes a communication path formed by the following: a mobile device of a user (hereinafter also referred to as "user mobile device") 210; a base station 220; a cellular network 230; another base station 245; and another mobile device 285. The cellular network 230 is coupled to one or more databases (hereinafter "database") 250. The database 250 is coupled to a network 260 which, in turn, is coupled to various information sources 270.

Figure 3:
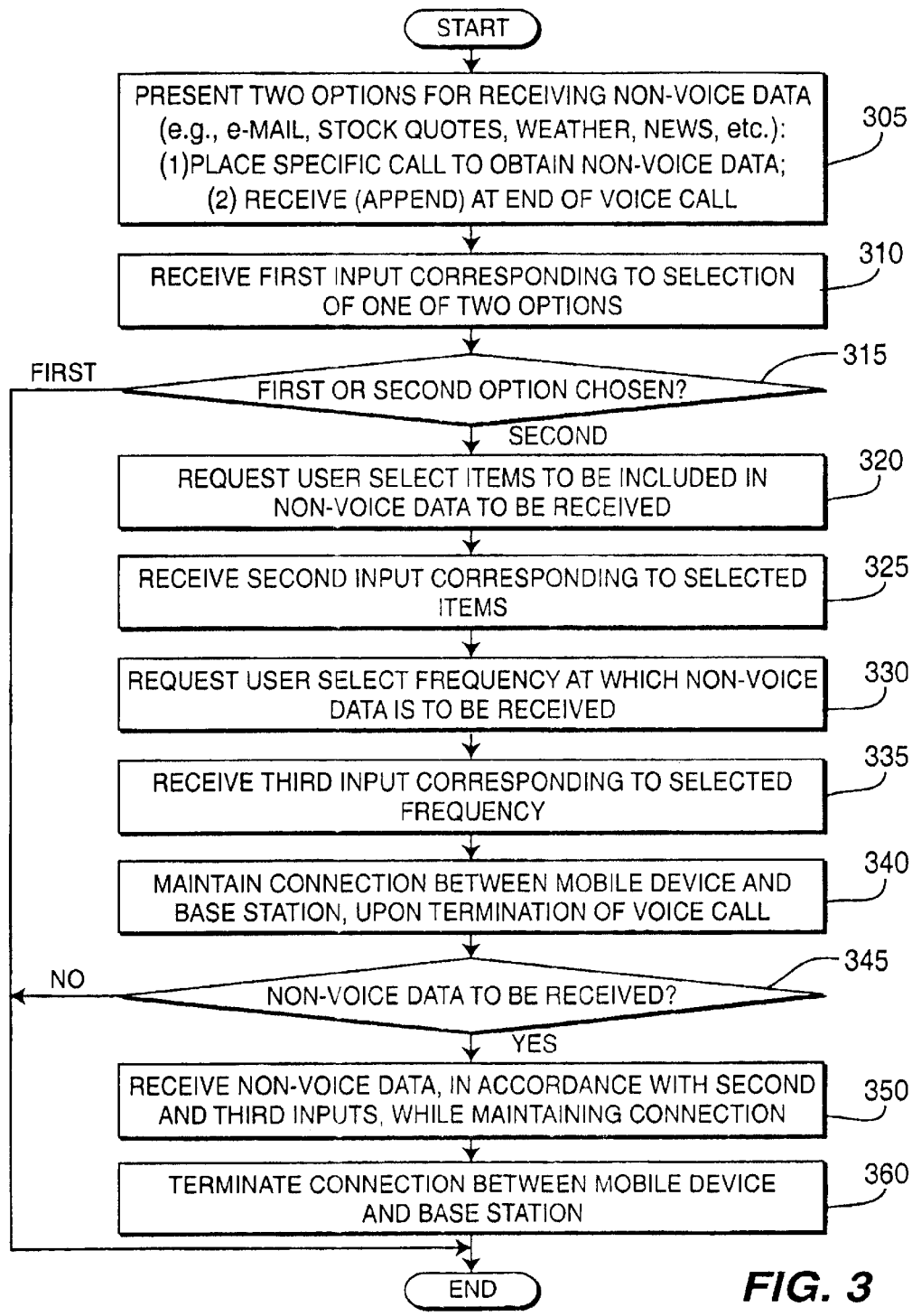
FIG. 3 is a flow diagram illustrating a method for providing non-voice data to a mobile device, according to an illustrative embodiment of the present invention.

FIG. 3 is a flow diagram illustrating a method for providing non-voice data to a mobile device (e.g., mobile device 220), according to an illustrative embodiment of the present invention. It is presumed that the mobile device (e.g., a cellular phone)has the capability to receive non-voice data (e.g., e-mail, stock quotes, weather, news, and other information).

The user is presented with a choice between two options for receiving the non-voice data (step 305). The first option is what is conventionally done to receive the non-voice data, that being for the user to place a specific call for the sole purpose of obtaining the updated information. For example, a new call is made with an Internet browser of the mobile device 220 to get new stock quote information.

The second option is for the user to automatically receive the non-voice data at the end of a voice call.

A first user input is received corresponding to a selection of either the first or the second option by the user (step 310).

It is then determined whether the user chose the first or the second option, based on the first user input received at step 310 (step 315). If the user chose the first option, then the method is terminated.

However, if the user chose the second option, then the user is requested to select items that are to be included in the non-voice data that is to be received (step 320). The items are preferably selected from among a plurality of items presented to the user for selection (e.g., perhaps the user wants e-mail and stock quotes to be updated, but is not interested in weather). A second user input is received corresponding to the selected items (step 325).

The user is requested to select a frequency at which the non-voice data is to be received (step 330). A third user input is received corresponding to the selected frequency (step 335).

Upon the termination of a voice call received or placed by the mobile device 220 of the user, a connection is maintained between the mobile device 220 and the base station 210 through which the voice call passed (step 340). The call could be to/from, for example, the landline phone 280 or another mobile device 285.

It is then determined whether the non-voice data is to be received, based on the second user input (selected items) and the third user input (frequency) (step 345). If not, then the method is terminated. Otherwise, the non-voice data is received, in accordance with the second user input and the third user input (step 350). The connection between the mobile device 220 and the base station 210 is terminated (step 360). The mobile device 220 is free to make/receive new calls.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for providing non-voice data to a mobile device, comprising the steps of:

maintaining a connection between the mobile device and a base station, when a user of the mobile device terminates a voice call provided through the base station (340);

receiving the non-voice data while the connection is maintained (350) at the user's option; and terminating the connection between the mobile device and the base station, upon performing said receiving step (360).

2. The method of claim 1, further comprising the step of receiving an input by the user corresponding to a frequency at which the non-voice data is to be received (335), said frequency (330) being related to time elapsed since a last said receiving of the non-voice data after a voice call is terminated, terminating a voice call before said time elapsed being followed by a termination of the connection between the mobile device and the base station.

3. The method of claim 1, further comprising the step of receiving an input by the user corresponding to a selection of items that are to be included in the non-voice data during said step of receiving the non-voice data (325), and wherein said step of receiving, the non-voice data is performed in accordance with the selection (350).

4. The method of claim 1, wherein the mobile device is a cellular phone.

5. The method of claim 1, wherein the non-voice data comprises at least one of e-mail, stock quotes, weather, and news (305).

6. In a mobile device wherein non-voice data is obtained by a user of the mobile device placing a specific call to obtain the non-voice data, a method for automatically obtaining the non-voice data, the method comprising the steps of:

providing the user with an option of appending the non-voice data to an end of a voice call (305); and automatically obtaining the non-voice data at an end of a voice call, when the option is selected by the user (350).

7. The method of claim 6, wherein said obtaining step comprises the step of maintaining a connection between the mobile device and a base station, upon a user terminating a voice call provided through the base station (340);

receiving the non-voice data while the connection is maintained (350); and terminating the connection between the mobile device and the base station, at a conclusion of said receiving step (360

8. The method of claim 6, further comprising the step of receiving an input by the user corresponding to a frequency at which the non-voice data is to be obtained (335), and wherein said obtaining step is performed in accordance with the frequency (350).

9. The method of claim 6, further comprising the step of receiving an input by the user corresponding to a selection of items that are to be included in the non-voice data during said obtaining step (325), and wherein said obtaining step is performed in accordance with the selection (350).

10. The method of claim 6, wherein the mobile device is a cellular phone.

11. The method of claim 6, wherein the non-voice data comprises at least one of e-mail, stock quotes, weather, and news (305).

12. A mobile device for receiving voice data and non-voice data, comprising:

means for maintaining a connection between the mobile device and a base station, when a user of the mobile device terminates a voice call provided through the base station (220);

means for receiving the non-voice data while the connection is maintained (220) at the user's option; and means for terminating the connection between the mobile device and the base station, upon receiving the non-voice data (220).

13. The mobile device of claim 12, further comprising means for receiving an input by the user corresponding to a frequency at which the non-voice data is to be received, said frequency (220, 330) being related to time elapsed since last receiving the non-voice data after a voice call is terminated, terminating a voice call before said time elapsed being followed by a termination of the connection between the mobile device and the base station.

14. The mobile device of claim 12, further comprising means for receiving an input by the user corresponding to a selection of items that are to be included in the non-voice data that is received by said means for receiving, and wherein means for receiving receives the non-voice data in accordance with the selection (220).

15. The mobile device of claim 12, wherein the mobile device is a cellular phone.

16. The mobile device of claim 12, wherein the non-voice data comprises at least one of e-mail, stock quotes, weather, and news (305).

* * * * *